(12) United States Patent
Burry et al.

(10) Patent No.: US 10,410,253 B2
(45) Date of Patent: Sep. 10, 2019

(54) SYSTEMS AND METHODS FOR DYNAMIC DIGITAL SIGNAGE BASED ON MEASURED CUSTOMER BEHAVIORS THROUGH VIDEO ANALYTICS

(71) Applicant: Conduent Business Services, LLC, Dallas, TX (US)

(72) Inventors: Aaron Burry, Ontario, NY (US); Peter Paul, Penfield, NY (US)

(73) Assignee: CONDUENT BUSINESS SERVICES, LLC, Florham Park, NJ (US)

( * ) Notice: Subject to any disclaimer, the term of this patent is extended or adjusted under 35 U.S.C. 154(b) by 231 days.

(21) Appl. No.: 15/390,848

(22) Filed: Dec. 27, 2016

(65) Prior Publication Data

US 2018/0181995 A1    Jun. 28, 2018

(51) Int. Cl.
*G06Q 30/02*     (2012.01)
*G06F 3/14*      (2006.01)
*G06K 9/00*      (2006.01)
*H04N 5/77*      (2006.01)
*H04N 7/18*      (2006.01)

(52) U.S. Cl.
CPC .......... *G06Q 30/0269* (2013.01); *G06F 3/14* (2013.01); *G06K 9/00771* (2013.01); *H04N 5/77* (2013.01); *H04N 7/18* (2013.01); *H04N 7/183* (2013.01)

(58) Field of Classification Search
CPC .. G06K 9/00; G06K 9/62; G06F 17/30; G06F 17/00
USPC ........................................................ 348/143
See application file for complete search history.

(56) References Cited

U.S. PATENT DOCUMENTS

| | | | | |
|---|---|---|---|---|
| 7,769,632 B2* | 8/2010 | Giraud | .................. | G06Q 30/02 455/39 |
| 7,974,869 B1* | 7/2011 | Sharma | .............. | G06Q 30/0202 705/7.31 |
| 8,219,438 B1* | 7/2012 | Moon | ................ | G06Q 30/0201 705/7.29 |
| 2015/0278897 A1* | 10/2015 | Nichols | .............. | G06Q 30/0639 705/26.41 |

* cited by examiner

*Primary Examiner* — Patricia I Young
(74) *Attorney, Agent, or Firm* — Fay Sharpe LLP (57) ABSTRACT

A dynamic digital signage system based on measured customer behaviors through video analytics.

9 Claims, 4 Drawing Sheets

SYSTEMS AND METHODS FOR DYNAMIC DIGITAL SIGNAGE BASED ON MEASURED CUSTOMER BEHAVIORS THROUGH VIDEO ANALYTICS

TECHNICAL FIELD

The presently disclosed embodiments are directed to signage systems, more particularly to a digital signage system, and still more particularly to a dynamic digital signage system based on measured customer behaviors through video analytics.

BACKGROUND

Many retailers are transitioning from basic, static signage to more engaging digital signage systems to attract customers. Existing types of digital signage can range from a simple design, to a more complicated, elaborate design which can be changed dynamically. Generally, retailers use digital signage to update item prices without having to change paper tags on shelves. However, this use of digital signage typically does not justify the added cost of the digital signage. Similarly, retailers can use digital signage to change larger promotional signage periodically (e.g., low frequency updates, generally static promotions, etc.). This use of digital signage systems only presents information to customers for a pre-determined length of time, such as, for example, during a sale event, etc. Thus, there remains a need for an improved digital signage system which can be changed dynamically, and which can be changed based on how engaging the signage is for customers (i.e. how much the signage holds the customers' attention).

More recent digital signage systems can include identifying features and or characteristics of an individual (e.g., age, race, gender, sex, height, etc.) to determine what advertisements and/or messages to display on the digital signage. Other recent digital signage systems can include identifying when an individual is actively viewing the display to measure customers' attention. In such systems, the signage is typically switched when the customers are no longer engaged. As such, it would be desirable to provide a dynamic digital signage system which can be changed based on who is viewing the signage, and/or how engaging the signage is to the viewer.

There is thus a need for an improved dynamic digital signage system which can measure broader customer behaviors within a retail environment, and leverage the measured customer behavioral information to adjust the information displayed on the digital signage.

BRIEF DESCRIPTION

According to aspects illustrated herein, there is provided a system capable of providing dynamic adjustment of digital signage in a retail store based on video-based measurements of shopper state and behavior in the surrounding scene, the system comprising: a video capture module having at least one camera capable of capturing frame images of a shopper within the retail store; a video analytics module capable of extracting information about the shopper's behavior and state from the captured frame images including selection recognition of shopper activity relative to purchasable items comprising predetermined behavior of physical handling of the items; a planner module capable of selecting a type of information to display on the digital signage based on the extracted information from the video analytics module; and, digital signage capable of presenting the selected type of information from the planner module to surrounding shoppers in the retail store.

According to aspects illustrated herein, there is also provided a system capable of providing dynamic adjustment of digital signage in a retail store based on video-based measurements of shopper state and behavior, the system comprising: a video capture module having at least one camera capable of capturing frame images of a shopper within the retail store, said video capture module further comprising (i) an information recording unit capable of recording the captured frame images, and, (ii) an information storage unit capable of storing the captured frame images; a video analytics module capable of extracting information about the shopper state and behavior from the captured frame images, said video analytics module further comprising (i) a captured frame image classification unit, said captured frame image classification unit operable to perform selected processes on the captured frame images including selection recognition of shopper activity relative to purchasable items comprising predetermined behavior of physical handling of the items, thereby generating a customer behavior class output, and, (ii) an information storage unit capable of storing the generated customer behavior class output information; a planner module capable of selecting the type of information to display on the digital signage based on the extracted information from the video analytics module, said planner module further comprising (i) a captured frame image information association unit wherein the captured frame images of shoppers captured by the video capture module are compared to captured frame images previously captured, and, digital signage capable of presenting the selected type of information from the planner module to the surrounding shoppers in the retail store.

According to aspects illustrated herein, there is provided a method for providing information to shoppers from a display in a retail store based on measured customer behaviors using a dynamic digital signage system, the method comprising: monitoring the display in the retail store by capturing frame images of the display; identifying the presence of a shopper at the display in the retail store in the captured frame images; detecting the activity of the shopper at the display in the retail store in the captured frame images including selection recognition of shopper activity relative to purchasable items comprising predetermined behavior of physical handling of the items; processing the captured frame images to generate a shopper behavior class output; and, providing information on the digital signage to the shopper at the display in the retail store based on the customer behavior class output.

DETAILED DESCRIPTION

The present description and accompanying drawing FIGURES illustrate the embodiments of an improved digital signage system, and more particularly a dynamic digital signage system based on measured customer behaviors through video analytics. Also provided is a more efficient method and system for providing useful information to shoppers in a retail environment using the presently described digital signage system.

Figure 1:
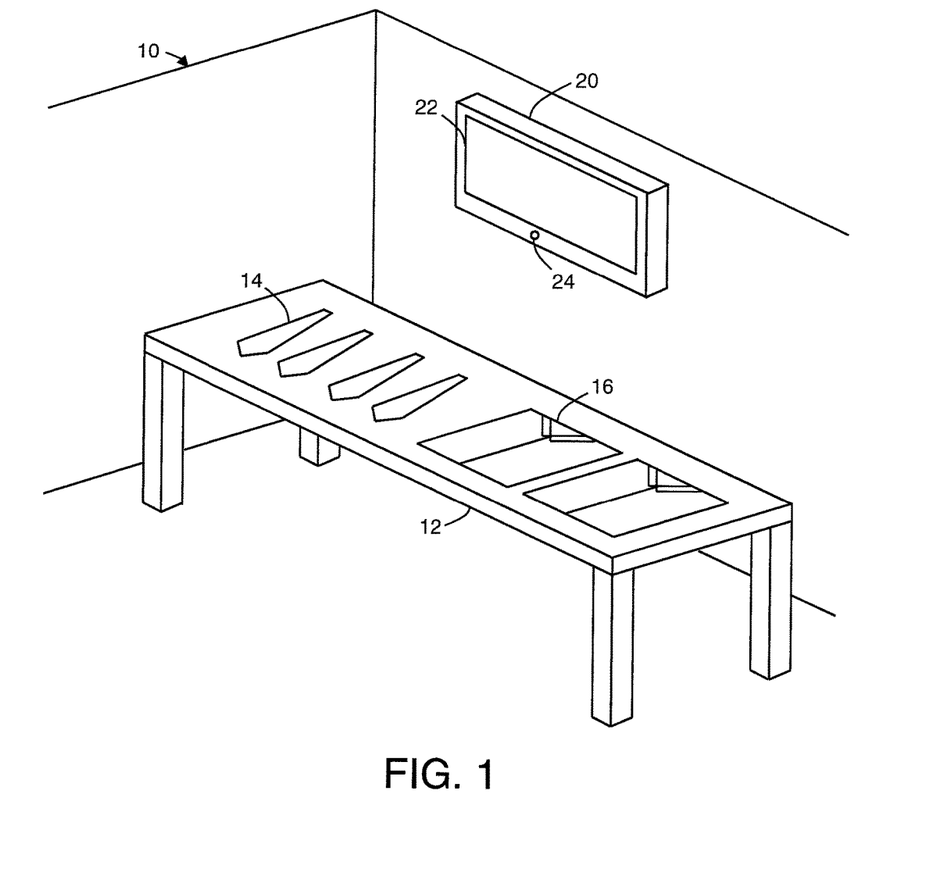
FIG. 1 is a perspective illustration of a store utilizing a digital signage system in accordance with one embodiment of the present disclosure.

FIG. 1 is a perspective illustration of a store 10 having a digital signage system in accordance with one embodiment of the present disclosure. As illustrated in FIG. 1, the store 10 is a retail store. Although the digital signage system is illustrated as being used with shoppers in a retail store, it can be appreciated that the digital signage system can be used with customers in other and/or alternative types of venues. A display 12 is positioned within the store 10 for the purpose of displaying a variety of products and/or items such as, for example, ties 14, shirts 16, etc. to one or more customers. The size of the display, shape of the display and products and/or items associated with the display 12 are non-limiting.

Signage 20 is illustrated as being positioned facing the front of the display 12 such that as one or more customers approach the display 12, the signage 20 can be easily and conveniently viewed by the one or more customers. Signage 20 is also illustrated as being a digital signage system provided with an LCD display 22, and which is capable of displaying selected types of information (e.g., marketing information, advertising information, promotional information, discount information, sale information, etc.) to the one or more customers at or near the display 12. Signage 20 is also illustrated as being provided with a camera 24 for capturing frame images of a customer at or near the front of the display 12. Camera 24 can be integrated into signage 20 and/or positioned exterior to signage 20. Signage 20 is described in further detail below.

Figure 2:
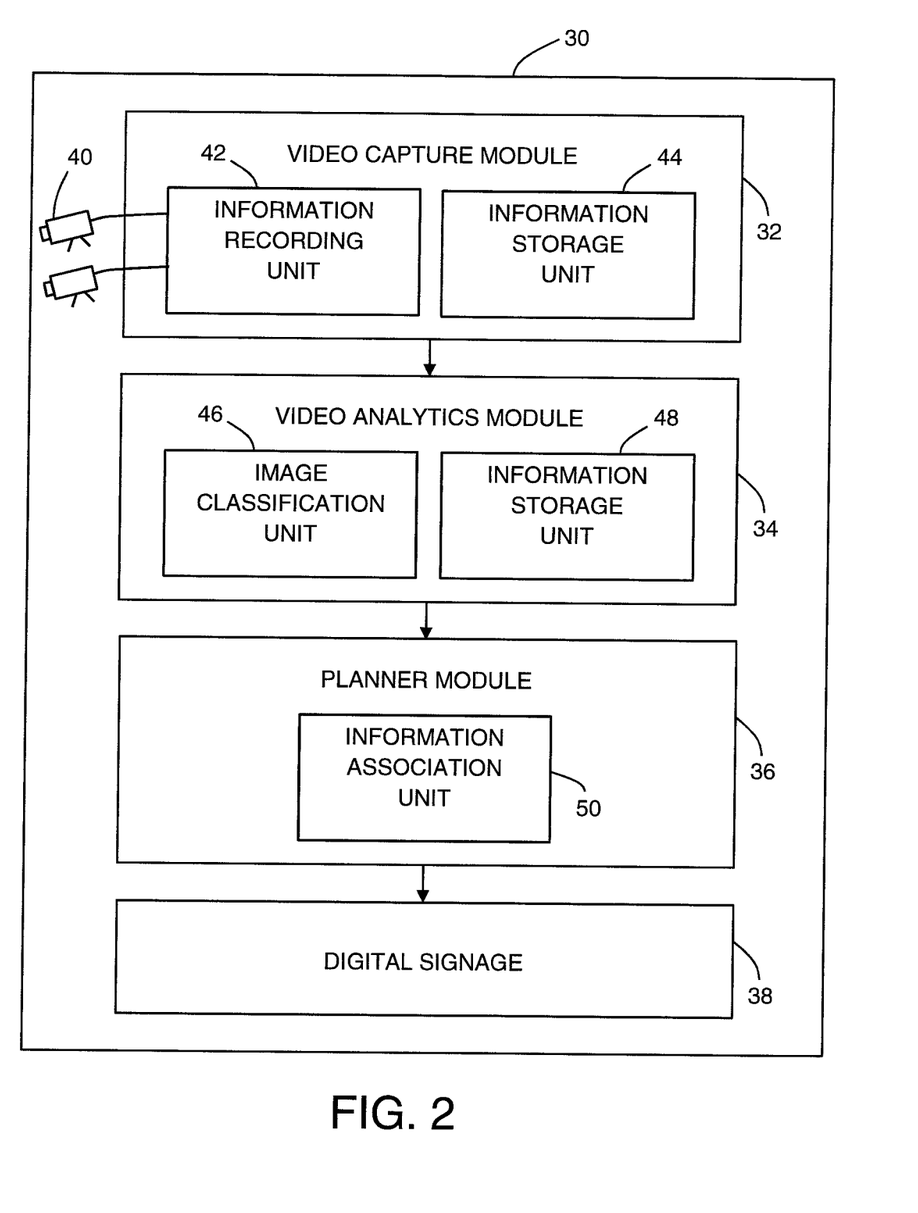
FIG. 2 is a functional block diagram illustrating a digital signage system in accordance with another embodiment of the present disclosure.

With reference now to FIG. 2, there is illustrated a schematic diagram of a digital signage system 30 in accordance with another embodiment of the present disclosure. Digital signage system 30 is capable of providing dynamic adjustment of digital signage in a retail store based on video-based measurements of shopper state and behavior in the retail environment. Digital signage system 30 is illustrated as including a video capture module 32, a video analytics module 34, a planning module 36 and digital signage 38.

Video capture module 32 is illustrated as including at least one camera 40 designed to capture video in the form of frame images of one or more shoppers within the retail store 10. In one embodiment, camera 40 is designed to capture frame images of shopper behavior within the retail store 10. Camera 40 is typically positioned at or near a display 12 in a store 10, and positioned facing the front of display 12 so as to capture frame images of one or more customers as said one or more customers approach the display 12. In the perspective illustration of FIG. 1, the camera 24 of signage 20 corresponds to the camera 40 of video capture module 32.

Video capture module 32 can include an information recording unit 42 for recording the captured frame images. Similarly, video capture module 34 can include an information storage unit 44 for storing the captured frame images. In one embodiment, the at least one camera 40 is a surveillance camera; however, the type of camera is non-limiting, and can be any type of camera suitable for indoor and/or outdoor tracking of one or more persons (e.g., camera, digital camera, video camera, digital video camera, or combinations thereof, etc.). Depending on 1) the type of camera used, and/or 2) the image capture geometry of the camera used, the frame rates of the camera can be in the range of from about 1 frame per second (fps) to about 300 fps, more typically from about 1.5 fps to about 50 fps, and still more typically from about 2 fps to about 30 fps. For example, if camera 40 is a fisheye camera, a greater frame rate is typically used to accommodate non-linear pose and/or orientation effects associated with such a camera.

In another embodiment, the at least one camera 40 is used to track shoppers within the field of view of the one or more cameras as the shoppers move throughout the store. Other and/or additional uses for camera 40 can include providing an associated mapping from image capture coordinates to real-world ground plane coordinates The video analytics module 34 is provided downstream (i.e. positioned after) from the one or more cameras 40 so as to receive information, such as, for example, captured frame images, from the one or more cameras 40. Video analytics module 34 is capable of overlaying pre-determined locations for displays, shelves, etc. within the field of view of camera 40, thereby allowing a translation of the shopper coordinates into semantic states such as, for example, "near the shirt and tie display". The video analytics module 34 is also capable of measuring the actions and/or behaviors of customers within the retail store from the captured frame images including selection recognition of shopper activity relative to purchasable items comprising predetermined behavior of physical handling of the items, and ultimately sending this information to digital signage 38. As such, the digital signage system can present information to a shopper based on measured customer behaviors of the physical handling of the purchasable item at a display. Given this information, the digital signage 38 in proximity to the shoppers can be adjusted so as to most effectively engage the shopper's attention, and assist in their purchase decisions, thereby driving customer satisfaction and sales. In one non-limiting example, the video analytics module 34 can identify that a particular shopper has picked up a shirt 16 at a display 12 but is actively searching for something that goes with it. Based on this information, a nearby digital signage 38 can offer a suggestion for a matching item, such as, for example, a tie 14, in the same display and/or in a nearby display. In another non-limiting example, the video analytics module 34 can identify that a particular shopper has been considering a particular item, such as, for example, shirt 16, for a long period of time. Based on this information, a nearby digital signage 38 can offer a promotion (e.g., discount, two-for-one, etc.) if the item being considered is purchased.

The video analytics module 34 can include a captured frame image classification unit 46 operable to perform selected processes on the captured frame images including operations such as, for example detecting the behavior and/or activity of the shopper at the display in the retail store in the captured frame images. For example, the video analytics module 34 is capable of using computer vision technology to convert the captured frame images to actionable shopper behavior and state information by operations including, but not limited to, object detection (e.g., customer detection, item detection, etc.) and/or object identification (e.g., specific customer identification, specific item identification, etc.). As such, the planner module 36 can use the classifying output (i.e. the actionable shopper behavior and state information) of the video analytics module 34 for displaying information to the customer via digital signage 38. Video analytics module 34 is also capable of using people tracking technology to provide information regarding the location and/or position of the shoppers relative to key displays in the retail space. Additionally, video analytics module 34 is capable of using image classification technology to classify key actions and/or behaviors of interest, such as, for example, actions and/or behaviors including picking up an item from a display, placing an item in a basket and/or cart, placing the item back on the display, holding the item while evaluating the item, etc. Video analytics module 34 is also capable of using image recognition technology to identify key actions and/or behaviors of interest, such as, for example, picking up an item from a display, placing an item in a basket and/or cart, placing the item back on the display, holding the item while evaluating the item, etc. In addition, the video analytics module 34 is capable of using image decoding technology to decode a customer behavior and action from the captured frame images. In one embodiment of the present disclosure, image-based classification on customer silhouettes is used to distinguish simple actions such as, for example, picking an item, walking, browsing, etc. In another embodiment of the present disclosure, fitting a deformable parts model (DPM) to identify component elements of human pose (e.g., arms, legs, torso, head, etc.) is used to detect the customer picking of an item from a display. Based on the captured frame image classifying output of the video analytics module 34, a basic data representation of where the customer is in the buying journey can be derived. As such, the video analytics module 34 is capable of determining whether or not the customer is searching items, browsing items, actively evaluating items, passively evaluating items, decided against purchasing items (i.e. put item back on the display), decided to purchase items (i.e. put item in cart and/or basket, moving on without placing item back on the display), etc. As such, the video analytics module is capable of (i) monitoring the display in the retail store by continuously tracking dwell and location of the shopper by recognizing where the shopper is positioned in the captured frame images, (ii) determining whether the shopper is dwelling in front of the display in the captured frame images, thereby identifying the presence of the shopper at the display in the retail store, (iii) classifying the behavior of the shopper, thereby generating a shopper behavior class output including behaviors including picking up the purchasable item from the display, placing the item in a basket or cart, placing the item back on the display, or holding an item while evaluating the item, (iv) determining whether the shopper picked up the purchasable item from the display in the captured frame images, (v) decoding the item picked up by the shopper in the captured frame images, thereby generating an item class output including items including shirts, ties, pants, shorts, socks, or articles of clothing, (vi) determining whether the item count of items picked up by the shopper is greater than zero in the captured frame images, and/or, (vii) determining whether the shopper put back an item to the display in the captured frame images.

In one embodiment of the preset disclosure, video capture module 32 and video analytics module 34 of the digital signage system 30 can be used to continuously track shoppers as they move throughout the store. As such, customer behavior from one region and/or department of the store can be carried over to another region and/or department of the store. This information carried over to subsequent departments can assist the planning module 36 in determining the most effective information for display on the digital signage 38. In one embodiment, different messaging and/or promotions could be used at a second display, picked up but put back items at the first display, or has picked up nothing from the first display. Path information (i.e. what order past displays were visited by a shopper) can optionally be used in determining what should be displayed on the digital signage 38.

The planning module 36 can include a captured frame image information association unit 50 capable of making associations between situational states measured by the video analytics module 34 and desired information to be displayed on the digital signage 38. Generally, the planning module 36 encodes domain and/or business knowledge of the most effective information (e.g., promotions, advertisements, pairings of clothing, etc.) for display on the digital signage 38 based on the current behaviors of surrounding shoppers. In one non-limiting embodiment, if it has been determined by the video analytics module 32 that a shopper has been evaluating an item for some length of time, it might be desirable to display one or more of the following on the digital signage 38:

a) a "buy-one-get-one" promotion that involves that item;
    b) more information regarding the item of interest;
    c) a glyph or other easily convertible link to enable the shopper to use their mobile device to connect to more information;
    c) suggestions for other items that might pair well with the item of interest; and/or,
    d) for clothing items, a display of that item on a model with other items that might pair well.

The relationships encoded within the planning module 36 can be based on subject matter experts in the retail space, on data mining and/or machine learning of past sales, designed experiments specifically intended to correlate sales and key factors (e.g., merchandising, promotions, etc.), or combinations thereof, etc.

Digital signage 38 is typically positioned at or near a display 12 in a store 10 so as to provide easy and convenient viewing for one or more shoppers in store 10. In the perspective illustration of FIG. 1, the signage 20 corresponds to the digital signage 38 of digital signage system 30.

In one embodiment, the digital signage system 30 can be used to provide information to shoppers at or near the display 12 in the retail store 10, wherein the information provided can be based on measured customer behaviors. As such, the digital signage system 30 can 1) monitor the display 12 in the retail store 10 by capturing frame images of the display, 2) identify the presence of a shopper at the display 12 in retail store 10 in the captured frame images, 3) detect the activity of the shopper at the display 12 in retail store 10 the captured frame images, 4) process the captured frame images to generate a customer behavior class output, and/or 5) provide information to the shopper on digital signage 38 at the display 12 in retail store 10 based on the customer behavior class output.

Figure 3:
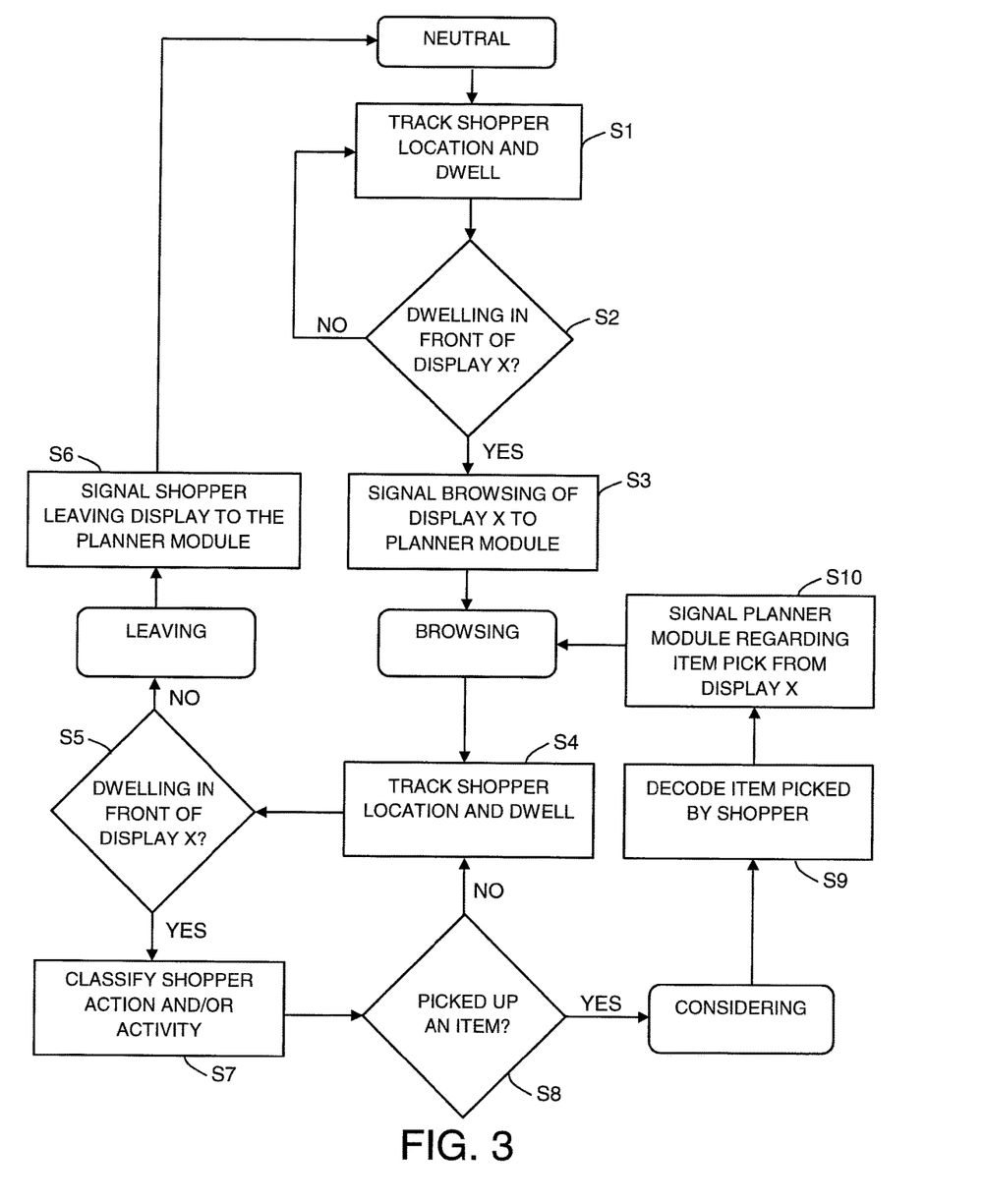
FIG. 3 is a flowchart illustrating a digital signage system in accordance with another embodiment of the present disclosure; and, FIG. 4 is a flowchart illustrating a digital signage system in accordance with another embodiment of the present disclosure.

A flowchart of the basic state and/or behavior estimation for a shopper is illustrated in FIG. 3.

In operation, camera 40 can continuously monitor the front of a display 12 positioned in a store 10, thereby providing a steady flow of video in the form of captured frame images to video analytics module 34. Additionally, the time at which the captured frame image was captured and/or the camera identification information of the camera which captured the captured frame images can be sent to the video analytics module 34. The video analytics module 34 can store one or more of 1) the captured frame image, 2) the time the captured frame image was captured, and/or 3) the camera identification information of the camera from which the captured frame image was captured in an information storage unit 48. Video analytics module 34 initiates the process (neutral) as shown in FIG. 3 upon receiving captured frame images from video capture module 32. During the process (neutral), the digital signage 38 can provide basic marketing information, advertising information, sale information, promotional information, etc. of items sold in the store 10.

In operation, camera 40 of video capture module 32 continuously captures frame images of customers as the customers walk throughout the store 10 and simultaneously sends the captured frame images to the video analytics module 34. In operation, as a customer approaches the display, the video analytics module 34 identifies the presence of the shopper at or near the display 12 by recognizing, such as, for example, by using trained object detection classifiers as are common in the field of computer vision, whether or not a customer is present in front of the display 12 in the captured frame images. As such, the video analytics module 34 can continuously track the dwell and location of the shopper (step S1) by leveraging computer vision methods, such as, for example, by tracking appearance features like color, color histogram, histogram of oriented gradients (HOG) or alternative differentiating appearance features on each customer, where the customer is positioned in the captured frame images. Similarly, the video analytics module 34 determines, such as, for example, by tracking individual customer trajectories, whether or not the shopper is dwelling in front of a display X (step S2) in the captured frame images.

When it is determined that a customer is not dwelling in front of display X in the captured frame images (step S2; No), video analytics module 34 concludes the processing of the captured frame images, and continues to track the dwell and location of the customer in the captured frame images (step S1). As illustrated in FIG. 3, the successive recognition of "track shopper location and dwell" (step S1) and "dwelling in front of display X?" (step S2) actions can optionally be continued until it is determined that a customer is dwelling in front of a display X in the captured frame images (step S2; Yes).

When it is determined that a customer is dwelling in front of display X in the captured frame image (step S2; Yes), the video analytics module 34 signals the planner module 36 that the customer is browsing the display (step S3), thereby initiating the process (browsing). During the process (browsing), digital signage 38 typically provides more specific marketing information, advertising information, sale information, promotional information, etc. for items sold at display 12 in store 10.

Similar to the process (neutral), during the process (browsing), camera 40 of video capture module 32 continuously captures frame images from video taken of the customer at the display, and sends the captured frame images to the video analytics module 34. As such, the video analytics module 34 can continuously track the dwell and location of the shopper (step S4) by leveraging computer vision methods, such as, for example, by tracking appearance features like color, color histogram, histogram of oriented gradients (HOG) or alternative differentiating appearance features on each customer, where the customer is positioned in the captured frame images. Similarly, the video analytics module 34 determines whether or not the shopper is dwelling in front of display X in the captured frame images (step S5).

When it is determined that a customer is not dwelling in front of display X in the captured frame images (step S5; No), video analytics module 34 concludes the process (browsing) and initiates the process (leaving). In one embodiment, during the process (leaving), the specific information from the process (browsing) is removed from digital signage 38, and the more basic information from the process (neutral) is typically displayed on digital signage 38. In another embodiment, during the process (leaving), the specific information displayed on the digital signage 38 during the process (browsing) can be exemplified such as, for example, by flashing, scrolling, etc. to attract the customers' attention. After initiating the process (leaving), the video analytics module 34 signals the planner module 36 that the shopper is leaving the display (step S6), thereby initiating the process (neutral).

When it is determined that a customer is dwelling in front of display X in the captured frame images (step S5; Yes), the video analytics module 34 can optionally classify, such as, for example, by bag-of-features based classification methods using HOG3D or dense trajectory features, the action and/or activity of the shopper in front of display X in the captured frame images (step S7), thereby generating a customer behavior class output. The customer behavior class output can include activities and/or behaviors including, but not limited to, picking up an item from a display, placing an item in a basket and/or cart, placing an item back on a display, holding an item while evaluating the item, etc. Optionally, the customer action and/or activity can be recorded and stored in the same information storage unit as 1) the captured frame image, 2) the time the captured frame image was captured, and/or 3) the camera identification information of the camera from which the captured frame image was captured. After optionally classifying the action and/or activity of the customer, and recording and/or storing the action and/or activity of the customer in the information storage unit, the video analytics module 34 can determine, such as, for example, by bag-of-features based classification methods using HOG3D or dense trajectory features, whether or not the shopper picked up an item from the display in the captured frame images (step S8).

When it is determined that the customer has not picked up an item in the captured frame image (step S8; No), the video analytics module 34 continues the (browsing) process, and continues to track the dwell and location of customers in the captured frame images (step S4). As illustrated in FIG. 3, the successive recognition of "dwelling in front of display X?" (step S5) and "picked up an item?" (step S8) actions can optionally be continued until it is determined that a customer has picked up an item in the captured frame images (step S8; Yes).

When it is determined that a customer has picked up an item in the captured frame images (step S8; Yes), the video analytics module 34 concludes the process (browsing) and initiates the process (considering). At this point in the customers' browsing journey, the shopper has picked up an item from the display and is considering purchasing the item. As such, during the process (considering), digital signage 38 typically provides specific marketing information, advertising information, sale information, promotional information, etc. for the item picked by the customer at display 12 in store 10. Additionally, when it is determined that a customer has picked up an item in the captured frame images (step S8; Yes), the view analytics module is capable of extracting information about the shopper behavior and state from the captured frame images including selection recognition of shopper activity relative to purchasable items comprising predetermined behavior of physical handling of the items.

After initiating the process (considering), the video analytics module 34 can optionally decode, such as, for example, by common computer vision methods for object detection and recognition including leveraging bag-of-features based image classification on scale-invariant feature transform (SIFT), histogram of oriented gradients (HOG), or convolution neural-network (CNN) based features, the item picked up by the shopper in the captured frame images (step S9), thereby generating an item class output. The item class output can include items including, but not limited to, shirts, ties, pants, shorts, socks, etc. Optionally, the item decoded from the captured frame images can be recorded and stored in the same information storage unit as 1) the captured frame image, 2) the time the captured frame image was captured, 3) the camera identification information of the camera from which the captured frame image was captured, and/or 4) the customer action and/or activity. After optionally decoding the item picked up by the shopper (step S9), recording the item picked up by the shopper, and/or storing the item picked up by the shopper, the video analytics module 34 can signal the planner module 36 1) the customer picked up an item, and/or 2) the type of item the customer picked up (step S10), thereby initiating the process (browsing).

Figure 4:
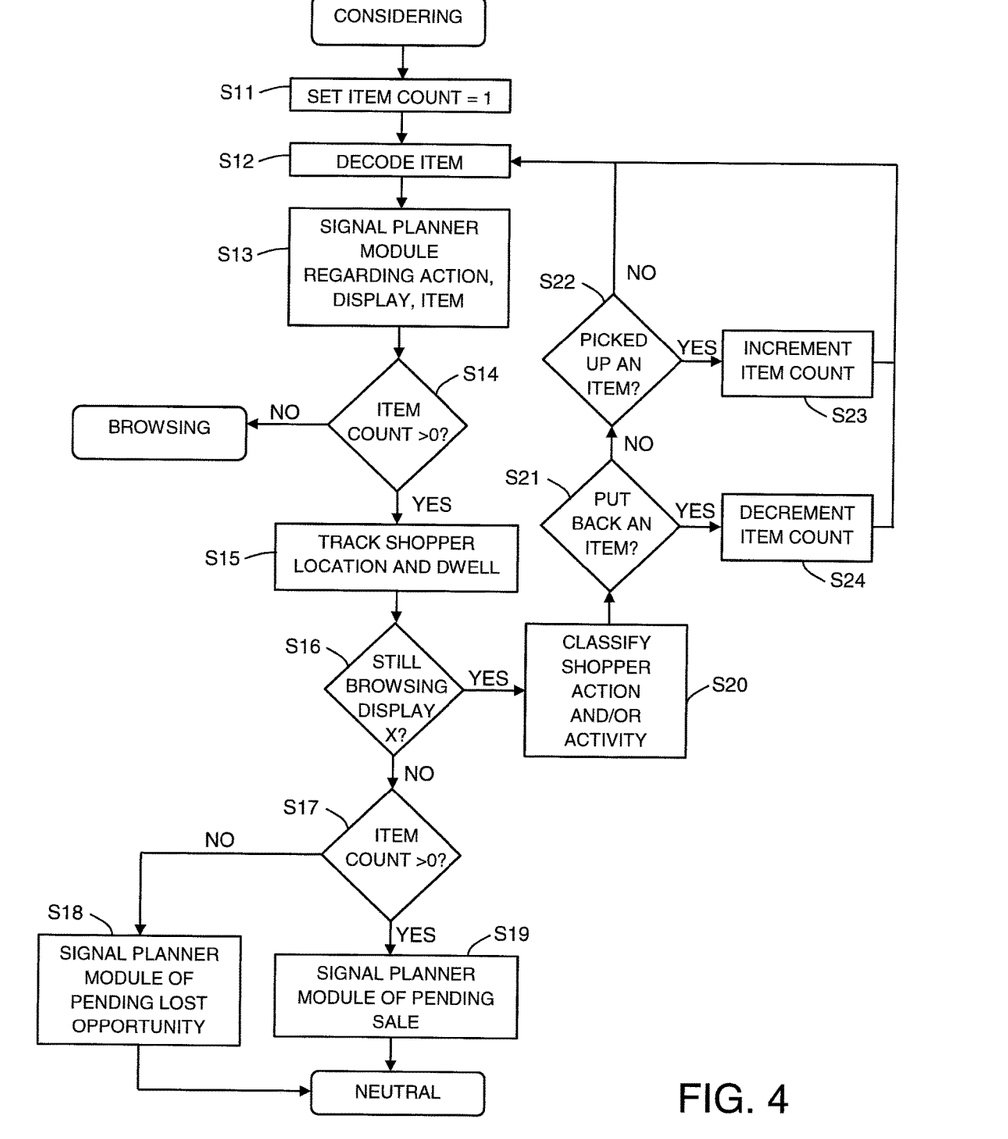

Referring now to FIG. 4, there is provided a flowchart illustrating other and/or additional steps between the processes (considering) and (browsing) of FIG. 3.

When it is determined, such as, for example, by bag-of-features based classification methods using HOG3D or dense trajectory features, that a customer has picked up an item in the captured frame images (step S8; Yes), the video analytics module 34 initiates the process (considering). After initiating the process (considering), the video analytics module 34 can set the item count at one item (step S11), the one item representing the item picked up by the customer (step S8; Yes). The video analytics module 34 can then optionally decode, such as, for example, by common computer vision methods for object detection and recognition including leveraging bag-of-features based image classification on scale-invariant feature transform (SIFT), histogram of oriented gradients (HOG), or convolution neural-network (CNN) based features, the item picked up by the shopper in the captured frame images (step S12), thereby generating an item class output. The item class output can include items including, but not limited to, shirts, ties, pants, shorts, socks etc. Optionally, the item decoded from the captured frame images can be recorded and stored in the same information storage unit as 1) the captured frame image, 2) the time the captured frame image was captured, 3) the camera identification information of the camera from which the captured frame image was captured, and/or 4) the customer action and/or activity.

After optionally decoding the item picked up by the shopper (step S12), recording the item picked up by the shopper, and/or storing the item picked up by the shopper in an information storage unit 48, the video analytics module 34 can signal the planner module 36 1) the customer picked up an item, 2) the type of item the customer picked up, 3) the action and/or activity of the customer, 4) the display from which the customer picked up an item, etc. (step S13).

From the captured frame images, the video analytics module 34 can determine, such as, for example, by leveraging computer vision methods to identify the "pick up" and "put back" actions, whether or not the item count of items picked up by the shopper is greater than zero (step S14). When it is determined that the item count is not greater than zero (i.e. no item has been picked up, an item was returned to the display, etc.), as illustrated by (step S14; No), the video analytics module concludes the process (considering) and initiates the process (browsing). During the transition from process (considering) to process (browsing), the item-specific information from the process (considering) is removed from the digital signage 38, and more general item information from the process (browsing) is typically presented on digital signage 38. Additionally, during the process (browsing), as described earlier, camera 40 of video capture module 32 continuously captures frame images from video taken of the customer at the display, and sends the captured frame images to the video analytics module 34 for further processing by image classification unit 46 of video analytics module 34.

When it is determined that the item count is greater than zero in the captured frame images (step S14; Yes), the video analytics module 34 continues to track the dwell and location of the shopper (step S15) by methods previously described. After it has been determined that the item count is greater than zero (step S14; Yes), the video analytics module 34 can determine, such as, for example, by trajectory analytics, whether or not the customer is still browsing display X in the captured frame images (step S16).

When it is determined that the customer is not still browsing display X in the captured frame images (step S16; No), video analytics module determines, such as, for example, by leveraging computer vision methods to identify the "pick up" and "put back" actions, whether or not the item count of items picked up by the shopper is greater than zero (step S17). When it is determined that the item count is not greater than zero (i.e. no item has been picked up, an item was returned to the display, etc.) in the captured frame images (step S17; No), the video analytics module 34 can signal the planner module 36 a pending lost opportunity for sale (step S18), thereby initiating the process (neutral). Similarly, when it is determined that the item count is greater than zero (step S17; Yes), the video analytics module 34 can signal the planner module 36 (step S19) a pending sale, thereby initiating the process (neutral). During the transition to the process (neutral), the item-specific information from the process (considering) can be removed from the digital signage 38, and basic information, such as, for example, marketing information, advertising information, sale information, promotional information, etc. can typically be presented on digital signage 38.

When it is determined that a customer is still browsing display X in the captured frame images (step S16; Yes), the video analytics module 34 can optionally classify, such as, for example, by a bag-of-features based classification methods using HOG3D or dense trajectory features on an input image, the action and/or activity of the shopper in front of display X in the captured frame images (step S20), thereby generating a customer behavior class output. The customer behavior class output can include activities and/or behaviors including, but not limited to, picking up an item from a display, placing an item in a basket and/or cart, placing an item back on a display, holding an item while evaluating the item, etc. Optionally, the customer action and/or activity can be recorded and stored in the same information storage unit as 1) the captured frame image, 2) the time the captured frame image was captured, and/or 3) the camera identification information of the camera from which the captured frame image was captured. Optionally, in retail environments where a plurality of digital signage is used, leveraging information based on the customer's action and/or activity recorded at one display can affect and/or influence the digital signage content at a subsequent or alternative retail display, such as, for example, digital signage positioned at an additional location within the retail store. After classifying the action and/or activity of the customer (step S20), recording the action and/or activity of the customer, and/or storing the action and/or activity of the customer in the information storage unit 48, the video analytics module 34 can determine, such as, for example, by common computer vision methods for object detection and recognition including leveraging bag-of-features based image classification on scale-invariant feature transform (SIFT), histogram of oriented gradients (HOG), or convolution neural-network (CNN) based features, whether or not the shopper put back an item to the display in the captured frame images (step S21).

When it is determined that the customer did put back an item in the capture frame images (step S21; Yes), the video analytics module 34 can decrement the item count (step S24). After the item count is decremented (step S24), the video analytics module 34 can decode, such as, for example, by a computer programmed to perform decoding of an input image, item returned to the display by the customer, and/or the item still held by the customer in the captured frame images (step S12).

When it is determined that the customer did not put back an item in the captured frame images (step S21; Yes), the video analytics module 34 can determine, such as, for example, by a bag-of-features based classification methods using HOG3D or dense trajectory features on an input image, whether or not the customer picked up another item in the captured frame images (step S22). When it is determined from the captured frame images that the customer did not pick up another item (step S22; No), the item held by the customer can be decoded in the captured frame images (step S12) such as, for example, by a computer programmed to perform decoding of an input image. When it is determined from the captured frame images that the customer did pick up another item in the captured frame images (step S22; Yes), the video analytics module 34 can increment the item count (step S23). After the item count is incremented (step S23), the video analytics module 34 can decode, such as, for example, by a computer programmed to perform decoding of an input image, the item held by the customer, and/or the additional item picked up by the customer (step S12).

As illustrated in FIG. 4, the number of items being considered by the shopper is determined by successive recognition of the "pick up" (step S22) and "put back" (step S21) actions. This additional information could be useful for the planning module 36 in determining what the most appropriate information would be to display on the digital signage 38. In one embodiment, if the shopper has picked up more than one item, it might be desirable to provide information to the customer on "buy-on-get-one" type promotions involving the items at that display. In another embodiment, if the shopper has only picked up a single item, it might be desirable to offer suggestions on the digital signage 38 for other items of interest at the display or in other areas of the store.

It will be appreciated that the variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system capable of providing dynamic adjustment of digital signage in a retail store based on video-based measurements of shopper state and behavior in the surrounding scene, the system comprising:
    a video capture module having at least one camera capable of capturing frame images of a shopper within the retail store;
    a video analytics module capable of extracting information about the shopper's behavior and state from the captured frame images including selection recognition of shopper activity relative to purchasable items comprising predetermined behavior of physical handling of the items comprising at least one of picking up an item from a display, placing an item in a basket and/or a cart, placing the item back on the display, and holding the item while evaluating the item;
    a planner module capable of selecting a type of information to display on the digital signage based on the extracted information from the video analytics module wherein the type of information comprises at least one of a suggestion for a matching item or a promotional discount; and,
    digital signage capable of presenting the selected type of information from the planner module to surrounding shoppers in the retail store.

2. The system of claim 1 wherein the video capture module further comprises:
    (i) an information recording unit capable of recording the captured frame images; and,
    (ii) an information storage unit capable of storing the captured frame images.

3. The system of claim 1 wherein the camera is selected from the group consisting of a digital camera, a video camera, or digital video camera.

4. The system of claim 1 wherein the video analytics module further comprises:
    (i) a captured frame image classification unit, said captured frame image classification unit operable to perform selected processes on the captured frame images, thereby generating a shopper behavior class output; and,
    (ii) an information storage unit capable of storing information including the generated shopper behavior class output information, the captured frame image, the time the captured frame image was captured, the camera identification information of the camera from which the captured frame image was captured, the shopper behavior and/or activity, and the item decoded from the captured frame images.

5. The system of claim 4 wherein the captured frame image classification unit is capable of processing the captured frame images by operations including the use of computer vision technology, people tracking technology, image classification technology, image recognition technology, or image decoding technology.

6. The system of claim 1 wherein the planner module further comprises:
    (i) a captured frame image information association unit wherein the captured frame images of shoppers captured by the video capture module are compared to captured frame images previously captured.

7. A system capable of providing dynamic adjustment of digital signage in a retail store based on video-based measurements of shopper state and behavior, the system comprising:
    a video capture module having at least one camera capable of capturing frame images of a shopper within the retail store, said video capture module further comprising:
        (i) an information recording unit capable of recording the captured frame images; and,
        (ii) an information storage unit capable of storing the captured frame images;

a video analytics module capable of extracting information about the shopper state and behavior from the captured frame images, said video analytics module further comprising:
- (i) a captured frame image classification unit, said captured frame image classification unit operable to perform selected processes on the captured frame images including selection recognition of shopper activity relative to purchasable items comprising predetermined behavior of physical handling of the items, thereby generating a shopper behavior class output wherein the shopper activity comprises picking up an item from a display, placing an item in a basket and/or cart, placing the item back on the display, and holding the item while evaluating the item; and,
- (ii) an information storage unit capable of storing the generated shopper behavior class output information;

a planner module capable of selecting the type of information to display on the digital signage based on the extracted information from the video analytics module, said planner module further comprising:
- (i) a captured frame image information association unit wherein the captured frame images of shoppers captured by the video capture module are compared to captured frame images previously captured; and, digital signage capable of presenting the selected type of information from the planner module to the surrounding shoppers in the retail store wherein the type of information comprises a suggestion for a matching item or a promotional discount.

8. The system of claim 7 wherein the captured frame image classification unit is capable of processing the captured frame images by operations including the use of computer vision technology, people tracking technology, image classification technology, image recognition technology, or image decoding technology.

9. The system of claim 7 wherein the information storage unit is capable of storing information including the captured frame image, the time the captured frame image was captured, the camera identification information of the camera from which the captured frame image was captured, the shopper action and/or activity, or the item decoded from the captured frame images.

* * * * *